United States Patent Office 3,397,215
Patented Aug. 13, 1968

3,397,215
ION EXCHANGE METHOD OF PREPARING QUATERNARY AMMONIUM COMPOUNDS
William P. Hettinger, Jr., Hinsdale, Ill., assignor to Nalco Chemical Company, Chicago, Ill., a corporation of Delaware
No Drawing. Filed Aug. 26, 1965, Ser. No. 482,909
10 Claims. (Cl. 260—429)

The instant invention is concerned with a method of preparing quaternary ammonium compounds via ion exchange techniques. More specifically, the present invention relates to an ion exchange method of preparing quaternary ammonium compounds having metal or non-metal oxides in the anionic portion of the molecule.

No simple direct method exists with respect to preparing quaternary ammonium compounds containing oxidic anions, that is, quaternaries having metal or non-metal oxides as anions. Commercially available quaternary ammonium materials generally have as the anionic counter ion to the organic portion of the molecule a common anion such as hydroxyl, halide, acetate, nitrate, etc. Attempts to produce the quaternaries containing oxidic anions usually result in complete failure, or at a minimum, extremely low uneconomical yields. For example, attempted preparation of such amine quaternaries by direct digestion of oxides and quaternary amine hydroxides usually leads to considerable decomposition of the organic reactant prior to any chemical transformation of the molecules.

It therefore becomes an object of the invention to provide an ion exchange technique for preparing organic amine quaternaries having oxidic anions via simple and direct procedures.

A more specific object of the invention is to prepare the just described quaternaries in good yields without degradation of reactants or desired product by utilization of certain specific ion exchange techniques.

Other objects will appear hereinafter.

In accordance with the invention a method of preparing quaternary ammonium compounds containing an oxidic anionic portion has been discovered. More specifically, quaternary ammonium compounds represented by the following structure may be simply and easily prepared:

$$Q_{2x-y}MO_x$$

where Q is a quaternary ammonium radical structure as follows:

where R is an alkyl radical of 1–2 carbon atoms, M is an atom of the group listed in the Periodic Table selected from the group consisting of I–B, III–A, IV–A, IV–B, VI–B and VIII, X is an integer of 1–4 and $y$ is the valence of said atom.

Broadly speaking the above type of quaternaries may be prepared by contacting a cation exchange resin with a quaternary having the following structure:

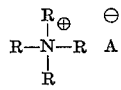

where R has a significance as above stated and A is a monovalent anion. This step has the effect of putting the cation exchanger in an amine form where the replaceable ionizable portion of the resin corresponds to the cationic portion of the above quaternary. Subsequent to this the amine form resin is then contacted with a compound of the following structure:

$$L_{2x-y}MO_x$$

where M, X and $y$ each have a significance as stated above and L represents an alkali metal. In this step the desired quaternary ammonium compounds, containing in the anionic portion oxides of metals or non-metals, are produced, and the amine form resin is put in an alkali metal form.

The cation exchange resins used in the practice of the invention are well-known materials which need little elaboration. While preferred resins of this type are the strong acid cation exchange resins, it is understood that the weak acid cation resins may be likewise used though not with as great efficiency as the strong acid type. Most of the above materials are formed by starting with normally solid benzene-insoluble copolymers of a monovinyl aromatic compound and a polyvinyl aromatic compound containing from 8.0% to 60% by weight, preferably from 8.0 to 40% by weight of the polyvinyl aromatic compound, chemically combined with 40% to 92% by weight of the monovinyl aromatic compound. Examples of suitable monovinyl aromatic compounds are styrene, alpha methyl styrene, chlorostyrenes, vinyl toluene, vinyl naphthalene, and homologues thereof, capable of polymerizing as disclosed, for example, in U.S. Patent 2,614,099. Examples of suitable polyvinyl aromatic compounds are divinyl benzene, divinyl toluene, divinyl xylene, divinyl naphthalene and divinyl ethyl benzene.

A typical strong acid cation exchange resin which provides exchangeable ions is prepared by sulfonating the above described copolymers. A preferred sulfonated cation exchange resin is Nalcite HCR–W, which is a sulfonated styrene-divinyl benzene strongly acidic cationic exchanger of the type described in U.S. Patent 2,366,007.

Another suitable type of hydrogen form strong acid cation exchange resin is a sulfonic acid phenol-formaldehyde resin such as a resin derived by condensing a phenol sulfonic acid with formaldehyde. In general, resins having a plurality of sulfonic acid groups are the most suitable strong acid cation exchange resins for purposes of this invention.

The weak acid resins that are used in the present process comprise the present commercially available weakly acidic type resins containing carboxylic and/or phenolic groups as the functional sites. These acids are analogous to weakly basic resins in most respects. The weak acid resins are operable at a pH above 5.5 and do not split salts of strong acids. One available product is identified by the trademark Zerolit 216. According to an article by A. Hinsley, Proc. 23d An. Water Conf. Engr. Soc. of Western Pennsylvania, October 1962, Zerolit 216 is a condensation product containing both phenolic and carboxylic groups.

The cation exchange resin as employed may be in any suitable form as long as the associated cation is readily exchangeable. Alkali metal resin forms may be utilized as well as the hydrogen form with the latter being preferred.

Another preferred class of cationic exchange resins are those which are considered porous in nature. For purposes of the invention a porous resin is considered one in which the uptake of cyclohexane over 12 hours is greater than 0.1 ml./gram of dry resin. These materials are commercially available, typical of which is Amberlite 200. Generally, porous resins of this type are prepared by synthesis of the polyvinyl-monovinyl copolymers in the presence of large amounts of solvents such as alcohols, aliphatics, aromatics, etc. More specifically, these resins are synthesized by copolymerizing the polyvinyl and monovinyl compound in solvents such as t-butyl alcohol, amyl alcohol, toluene, xylene, ethylene dichloride, hexane, heptane, etc., with the solvent comprising 20–70% by weight of the total quantity of monomers plus solvent. The porous copolymers thus produced are then transformed into ion exchange resins by conventional techniques such as sulfonation, etc. These porous resins have added advantages in that the low molecular weight organic quaternaries are easily allowed into the pores, whereby an amine form of the resin is produced.

It is important that substantially all the ions such as hydrogen ions of the cation exchange resin be removed and replaced with amine groups. If incomplete conversion of hydrogen form to the amine form is effected, considerable clogging due to gelation takes place in the subsequent step described more fully hereinafter. The porous resins are preferred in that not only do they allow excellent exchange of hydrogen form to amine form, but also they do not swell as much as the better known conventional non-porous or gel-type cation exchange resins, the latter also being normally characterized as water-swellable. Lastly, the porous resins have relatively high capacity allowing more complete conversion of ionizable groups.

The hydrogen form cation exchanger is simply and easily placed in amine form by contacting the hydrogen form resin with a source of a quaternary ammonium compound such as the hydroxide, wherein the organic portion of the quaternary is represented by the following formula:

where R is an alkyl radical of 1–2 carbon atoms. Preferred quaternaries include the quaternary halides and hydroxide with the latter being most preferred.

The contact may be made by any conventional means as long as the cation resin is completely converted into the amine form. For example, a solution of a quaternary hydroxide may be passed through a column of resin until all amine form resin is realized. Likewise, the hydrogen form resin may be slurred in batch form with an aqueous solution of quaternary ammonium hydroxide. As a specific example, a strong acid cationic exchanger in hydrogen form may be simply and easily transformed into amine form by passing a solution of tetramethylammonium hydroxide through the hydrogen form resin until all of the ionizable hydrogen groups are replaced with tetramethylammonium groups.

After the organic amine form cation exchange resin is produced, the desired products of the invention are produced by contacting said amine form resin with a compound having the general structure:

$$L_{2x-y}MO_x$$

where M, X and y each have a significance as above stated and L is an alkali metal. Preferred alkali metals are sodium and potassium. In this step, generally referred to as salt-splitting, the alkali metal such as sodium is then exchanged for the quaternary ammonium cation and the desired quaternary ammonium compounds containing oxidic metal or non-metal anions are produced. Preferred metals forming a portion of the ion exchange treated compounds include iron, chromium, aluminum, gallium, copper, cobalt, nickel, silver, gold, zinc, cadmium, silicon, germanium, tin, lead, titanium, zirconium, thorium, molybdenum, tungsten, platinum, antimony, etc. Among these the most preferred metals are aluminum, chromium, iron, zinc, tungsten, tin, nickel, molybdenum, lead, titanium and silicon. Thus, typical materials which may be treated with the amine form of the ion exchange resin to yield the corresponding quaternary ammonium compound include sodium aluminate, sodium tungstate, sodium stannate, sodium silicate, sodium zincate, sodium titanate, sodium molybdate, sodium plumbate, etc. More preferred compounds which may be contacted with the amine form of the cation exchange resin and thus transformed are metals whose oxides are amphoteric in nature. Another preferred class of materials easily treated are those which are capable of forming hydrous metal oxide sols.

After the just described step takes place whereby the alkalimetal is exchanged on the resin for the quaternary ammonium cation yielding the desired products, the produced alkali metal form of the cation exchange resin may be utilized as such or is easily regenerated back to the hydrogen form by addition thereto of strong acids as hydrochloric or sulfuric. The resin is then ready for use again in the overall described process.

Again, preparation of the desired products of the invention by contact of an amine form resin with the alkali metal oxidic metal or non-metal compounds may be effected by the above discussed column or batch technique, with the former being preferred due to ease of preparation and economic advantages. Also, aqueous solutions of the salt to be split in the second step of the invention are preferred forms. For more complete conversion it is preferred that the aqueous salt solutions to be transferred into product quaternary ammonium salts have a pH greater than about 12. This prevents their gelation upon the resin, particularly if a column technique is to be carried out. In a specific embodiment of the invention, just prior to passage of the salt to be converted, an aqueous solution of a quaternary hydroxide whose cationic portion corresponds to the quaternary cation already on the resin is carried out to maintain all exchange sites in amine form. This is to prevent any significant change in pH which will cause precipitation within the resin bed.

The following examples illustrate typical modes of carrying out the process of the invention. It is understood, of course, that these examples are merely illustrative and that the invention is not to be limited thereto.

Example I

In this example tertamethylammonium aluminate was prepared.

In the first stage of this experiment tetramethylammonium hydroxide was prepared via conversion of tetramethylammonium chloride. Specifically 8000 ml. strong base anion exchange resin in hydroxide form were placed into a 3″ I.D. tube and rinsed. A total of 740 grams of tetramethylammonium chloride dissolved in 14.8 liters of D.I. water (5% solution) were passed through the resin for a period of two hours.

Next, 3500 ml. of Amberlite 200 in sodium form were placed into a 3″ I.D. tube (equivalent to 32″ bed height) and converted to the hydrogen form by passing 6.0 lbs. of sulfuric acid (66° Bé. or 50 lbs. of sulfuric acid per cubic foot resin) as a 5% solution through the resin. The resin was completely rinsed free of acid and converted to the tetramethylammonium form by passing 13.4 liters of tetramethylammonium hydroxide through the resin in two hours. A light colored band moving downward was observed and spot sampling indicated that the color band was identical with the extent of conversion.

One-half of the remaining 1400 ml. tetramethylammonium hydroxide solution was then added to the top of the Amberlite 200 resin and sodium aluminate passed through in two hours as follows:

728 grams of a 48% sodium aluminate solution containing 2½% excess NaOH were diluted with 2400 ml. of warm D.I. water (140° F.). The total solution was 2800 ml., equivalent to approximately 12.5% solution by calculation. The warm solution was passed through the resin at 50–75 ml. per minute. This relatively slow flow rate was selected to assure a very small exhaustion band in the resin whereby sodium leakage at the end of the run was minimized. Various fractions were collected yielding a composite having a total concentration of tetramethylammonium aluminate of 8.62%. This product could be used as such, further concentrated or isolated in solid form.

Example II

This example was run according to the general procedures outlined in Example I above with the exception that sodium tungstate was passed through the cation exchange resin in the amine form to produce a tetramethylammonium tungstate material.

Example III

Again, the techniques outlined in Example I were followed with the exception that sodium stannate was the salt split in this instance to produce the corresponding tetramethylammonium stannate.

The compositions of the invention may be utilized for a variety of purposes; for example, they may be employed as ceramic binders, as adhesion promoters for fiberglass and resins, as catalysts, etc.

It is apparent that many modifications and variations of the invention may be practiced other than those specifically enumerated without departing from the true scope of the invention.

The invention is hereby claimed as follows:

1. A method of preparing quaternary ammonium compounds of the following structure:

$$Q_{2x-y}MO_x$$

where Q is a quaternary ammonium radical of the structure:

where R is an alkyl radical of 1–2 carbon atoms, M is an atom of a group listed in the Periodic Table selected from the group consisting of I–B, III–A, IV–A, IV–B, VI–B, and VIII, X is an integer of 1–4 and y is the valence of said atom; which comprises the steps of contacting a cation exchange resin with a quaternary ammonium salt containing said above radical whereby said resin is put in an amine form, and subsequently contacting said amine form resin with a compound having the formula $$L_{2x-y}MO_x$$

where M, X and y each have a significance as above stated and L is an alkali metal.

2. The method of claim 1 wherein said resin is a strong acid cation exchange resin.

3. The method of claim 2 wherein said resin is a porous resin.

4. The method of claim 1 wherein R represents a methyl group.

5. A method of preparing quaternary ammonium compounds of the following structure:

$$Q_{2x-y}MO_x$$

wherein Q is a quaternary ammonium radical of the structure:

where R is an alkyl radical of 1–2 carbon atoms, M is an atom selected from the group consisting of Al, Cr, Fe, Zn, W, Sn, Ni, Mo, Pb, Ti and Si, X is an integer of 1–4 and y is the valence of said atom, which comprises the steps of contacting a cation exchange resin in the hydrogen form with a quaternary hydroxide containing said above radical whereby said resin is put in an amine form, and subsequently contacting said amine form resin with a compound having the formula $L_{2x-y}MO_x$ where M, X and y each have a significance as above stated, and L is an alkali metal.

6. The method of claim 5 wherein said resin is a strong acid cation exchange resin.

7. The method of claim 6 wherein said strong acid cation exchange resin is a porous resin.

8. The method of claim 5 wherein R represents a methyl radical.

9. A method of preparing quaternary ammonium compounds of the following structure:

$$Q_{2x-y}MO_x$$

where Q is a quaternary ammonium radical of the structure

where R is an alkyl radical of 1–2 carbon atoms, M is an atom selected from the group consisting of Al, Cr, Fe, Zn, W, Sn, Ni, Mo, Pb, Ti and Si, X is an integer of 1–4 and y is the valence of said atom; which comprises the steps of passing an aqueous solution containing a quaternary hydroxide compound having said above radical through a column of a porous strong acid cation exchange resin in the hydrogen form, whereby substantially all the ionizable exchangeable ions on said resin are said amine radicals, and subsequently passing an aqueous solution containing a compound having the formula $$L_{2x-y}MO_x$$

through the resin in amine form whereby the aqueous effluent contains said desired quaternary ammonium compound, where M, X, and y each have a significance as above stated and L is an alkali metal.

10. The method of claim 9 wherein said quarternary hydroxide is tetramethylammonium hydroxide, and said $L_{2x-y}MO_x$ compound is sodium aluminate.

References Cited

Sussman et al., Ind. and Eng. Chem., vol. 37 (1945), pp. 618–624.

HELEN M. McCARTHY, *Primary Examiner.*

A. P. DEMERS, *Assistant Examiner.*